United States Patent
Feng

(10) Patent No.: US 8,049,586 B2
(45) Date of Patent: Nov. 1, 2011

(54) MAGNETIC COUPLER

(75) Inventor: Chu-Hsiang Feng, Taichung County (TW)

(73) Assignee: National Tsing Hua University, Hsinchu (TW)

( * ) Notice: Subject to any disclaimer, the term of this patent is extended or adjusted under 35 U.S.C. 154(b) by 80 days.

(21) Appl. No.: 12/267,083

(22) Filed: Nov. 7, 2008

(65) Prior Publication Data
US 2010/0052834 A1 Mar. 4, 2010

(30) Foreign Application Priority Data

Aug. 26, 2008 (TW) .............................. 97132472 A

(51) Int. Cl.
*H01F 7/02* (2006.01)
*H01H 7/20* (2006.01)
*A63H 33/04* (2006.01)

(52) U.S. Cl. ............. 335/285; 335/306; 446/92; 24/303
(58) Field of Classification Search ................ 335/285, 335/306; 446/92, 137–139; 24/303
See application file for complete search history.

(56) References Cited

U.S. PATENT DOCUMENTS

| 4,317,969 | A | * | 3/1982 | Riegler et al. | 200/52 R |
| 5,458,522 | A | * | 10/1995 | Brooks, III | 446/85 |
| 6,749,480 | B1 | * | 6/2004 | Hunts | 446/92 |
| 7,320,633 | B2 | * | 1/2008 | Park | 446/92 |
| 7,329,128 | B1 | * | 2/2008 | Awad | 439/38 |
| 7,413,493 | B2 | * | 8/2008 | Toht et al. | 446/92 |
| 7,625,213 | B1 | * | 12/2009 | Tse | 439/39 |
| 2004/0116038 | A1 | * | 6/2004 | Hunts | 446/92 |
| 2009/0123233 | A1 | * | 5/2009 | Herzogenrath | 405/70 |
| 2010/0066082 | A1 | * | 3/2010 | Aubert et al. | 285/408 |

FOREIGN PATENT DOCUMENTS

| CN | 2563354 | | 7/2003 |
| KR | 2008092029 | A * | 10/2008 |
| TW | 587133 | | 5/2004 |

* cited by examiner

*Primary Examiner* — Anh Mai
*Assistant Examiner* — Bernard Rojas
(74) *Attorney, Agent, or Firm* — Muncy, Geissler, Olds & Lowe, PLLC

(57) ABSTRACT

A magnetic coupler includes a first body, a second body and a plurality of magnetic elements. The first body has a first front side and a first backside. The first front side is formed with a plurality of positioning slots. The second body has a second front side and a second backside. The second backside is mounted on the first front side. The second body is formed with a plurality of positioning holes penetrating through the second body. Each magnetic element has a first portion and a second portion. The first portions of the magnetic elements respectively penetrate through the positioning holes so that the second portions of the magnetic elements are respectively embedded into the positioning slots.

14 Claims, 4 Drawing Sheets

MAGNETIC COUPLER

This application claims priority of No. 097132472 filed in Taiwan R.O.C. on Aug. 26, 2008 under 35 USC 119, the entire content of which is hereby incorporated by reference.

BACKGROUND OF THE INVENTION

1. Field of Invention

The invention relates to a magnetic coupler, and more particularly to a magnetic coupler having a second body for mounting multiple magnetic elements on a first body of the magnetic coupler.

2. Related Art

Magnetic couplers provide the power transmission between different media, and can reduce the vibration and the noise. The magnetic transmission is the most effective and safest solution in the field of encapsulation or sealing. The magnetic transmission technique is to transmit the power of a power source to internal magnetic members on a working shaft through external magnetic members on a shaft of the power source. The internal magnetic members are separated from the external magnetic members by an isolation sheath so that the working shaft needs not to extend out of the space to be closed and the leakage-free effect can be achieved without the encapsulation technique. The magnetic transmission technique is mainly applied to pumps, compressors, stirring machines and valves in the chemical industry, the petrochemical industry, the medicinal industry and the food industry. Thus, the enhanced performance of the magnetic coupler is gradually emphasized.

Among many magnetic couplers, several fan-shaped magnets are fixed to a body via an adhesive. The property of the adhesive may be changed due to the used period of time and the environment so that the adhesive intensity is deteriorated, and the coupler cannot work normally.

Thus, it is an important subject of the invention to provide a magnetic coupler having magnets that can be effectively fixed.

SUMMARY OF THE INVENTION

It is therefore an object of the invention to provide a magnetic coupler capable of effectively fixing magnets so that the magnetic coupler may be assembled more conveniently and has the extended lifetime and the enhanced performance.

The invention achieves the above-identified object by providing a magnetic coupler including a first body, a second body and a plurality of magnetic elements. The first body has a first front side and a first backside. The first front side is formed with a plurality of positioning slots. The second body has a second front side and a second backside. The second backside is mounted on the first front side. The second body is formed with a plurality of positioning holes penetrating through the second body. Each magnetic element has a first portion and a second portion. The first portions of the magnetic elements respectively penetrate through the positioning holes so that the second portions of the magnetic elements are respectively embedded into the positioning slots.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
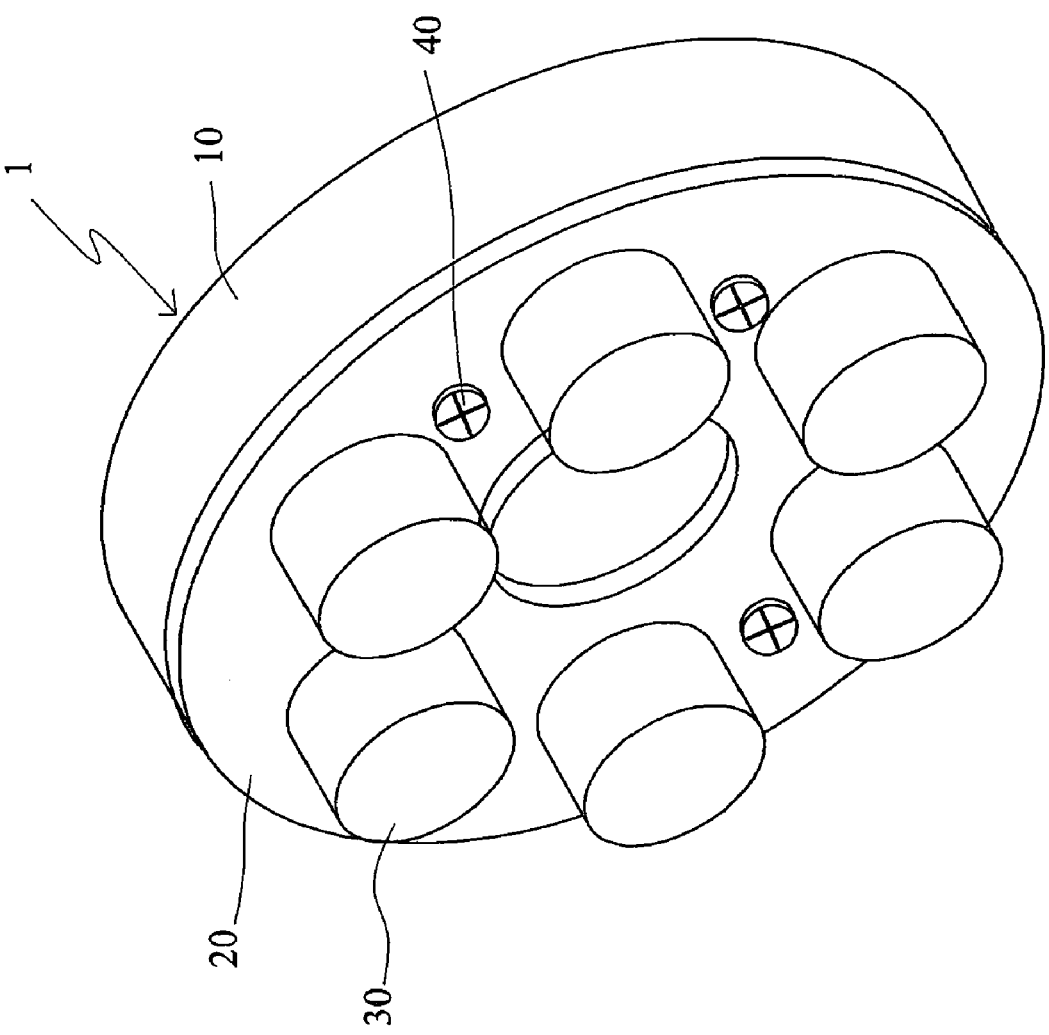
FIG. 1 is a schematically assembled view showing a magnetic coupler according to a first embodiment of the invention.
Figure 2:
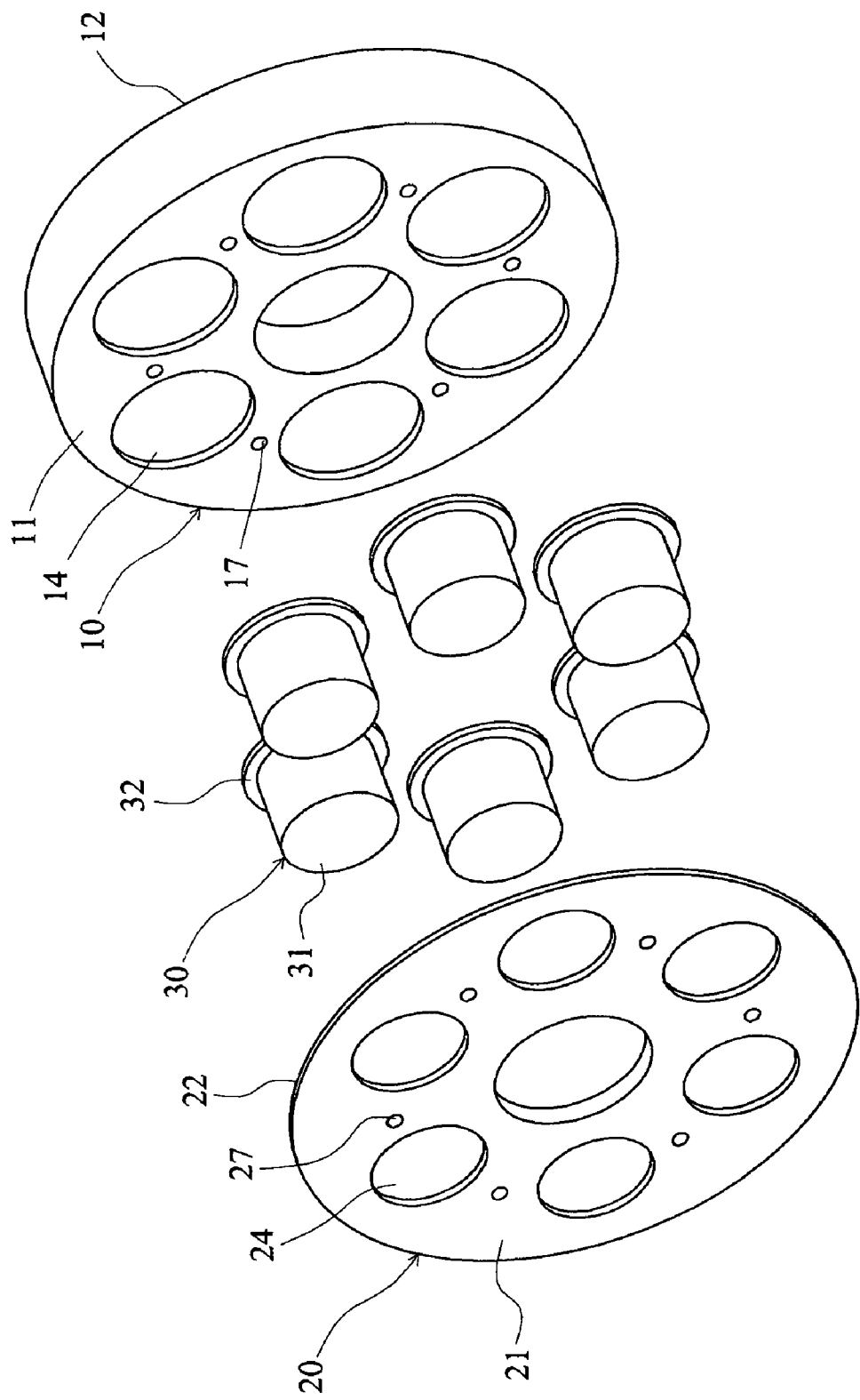
FIG. 2 is a schematically decomposed view showing the magnetic coupler according to the first embodiment of the invention.

FIG. 1 is a schematically assembled view showing a magnetic coupler 1 according to a first embodiment of the invention. FIG. 2 is a schematically decomposed view showing the magnetic coupler according to the first embodiment of the invention. Referring to FIGS. 1 and 2, the magnetic coupler 1 includes a first body 10, a second body 20 and a plurality of magnetic elements 30.

The first body 10 has a first front side 11 and a first backside 12. The first front side 11 is formed with a plurality of positioning slots 14.

The second body 20, disposed outside the first body 10., has a second front side 21 and a second backside 22. The second backside 22 is mounted on the first front side 11. The second body 20 is formed with a plurality of positioning holes 24 penetrating through the second body 20. The thickness of the second body 20 is smaller than the thickness of the first body 10.

Each of the magnetic elements 30 has a first portion 31 and a second portion 32. The first portions 31 of the magnetic elements 30 respectively penetrate through the positioning holes 24 so that the second portions 32 of the magnetic elements 30 are respectively embedded into the positioning slots 14. The size of each second portion 32, accommodated within the positioning slot 14, greater than the size of each first portion 31, accommodated within the positioning hole 24. Herein, the size represents the diameter of the circular cross-sectional area of the magnetic element 30. In this embodiment, each of the second portions 32 of the magnetic elements 30 is a flange. The flange may be pressed against the first body 10 by the second body 20 so that the magnetic element 30 is firmly fixed on the first body 10.

In this embodiment, the first body 10 and the second body 20 have circular shapes with the same diameter. However, the invention is not limited thereto. The first body 10 and the second body 20 may also have polygonal shapes, and the shape of the first body 10 may be different from that of the second body 20. In addition, although the positioning holes 24 and the positioning slots 14 of this embodiment have circular shapes, the invention is not restricted thereto. The positioning holes 24 and the positioning slots 14 may also have other shapes.

The magnetic elements 30 may be fixed to the first body 10 through the second body 20 by way of, for example, screwing, riveting, welding or adhering. Each of the magnetic elements 30 may be a neodymium-iron-boron (NdFeB) magnet. In this embodiment, the first front side 11 of the first body 10 is formed with a plurality of screw holes 17, and the second front side 21 of the second body 20 is formed with a plurality of through holes 27. Thus, screws 16 may respectively penetrate through the through holes 27 and be screwed into the screw holes 17 to fix the second body 20 onto the first body 10. The second body 20 presses the magnetic elements 30 to fix the magnetic elements 30 onto the first body 10. Thus, the arrangement of the magnetic elements 30 may be changed according to the designs of the second body 20 and the first body 10.

In this embodiment, the first body 10 is composed of a magnetic-conducting material, and the second body 20 is composed of a non-magnetic-conducting material. Also, the invention is not limited thereto.

Figure 3:
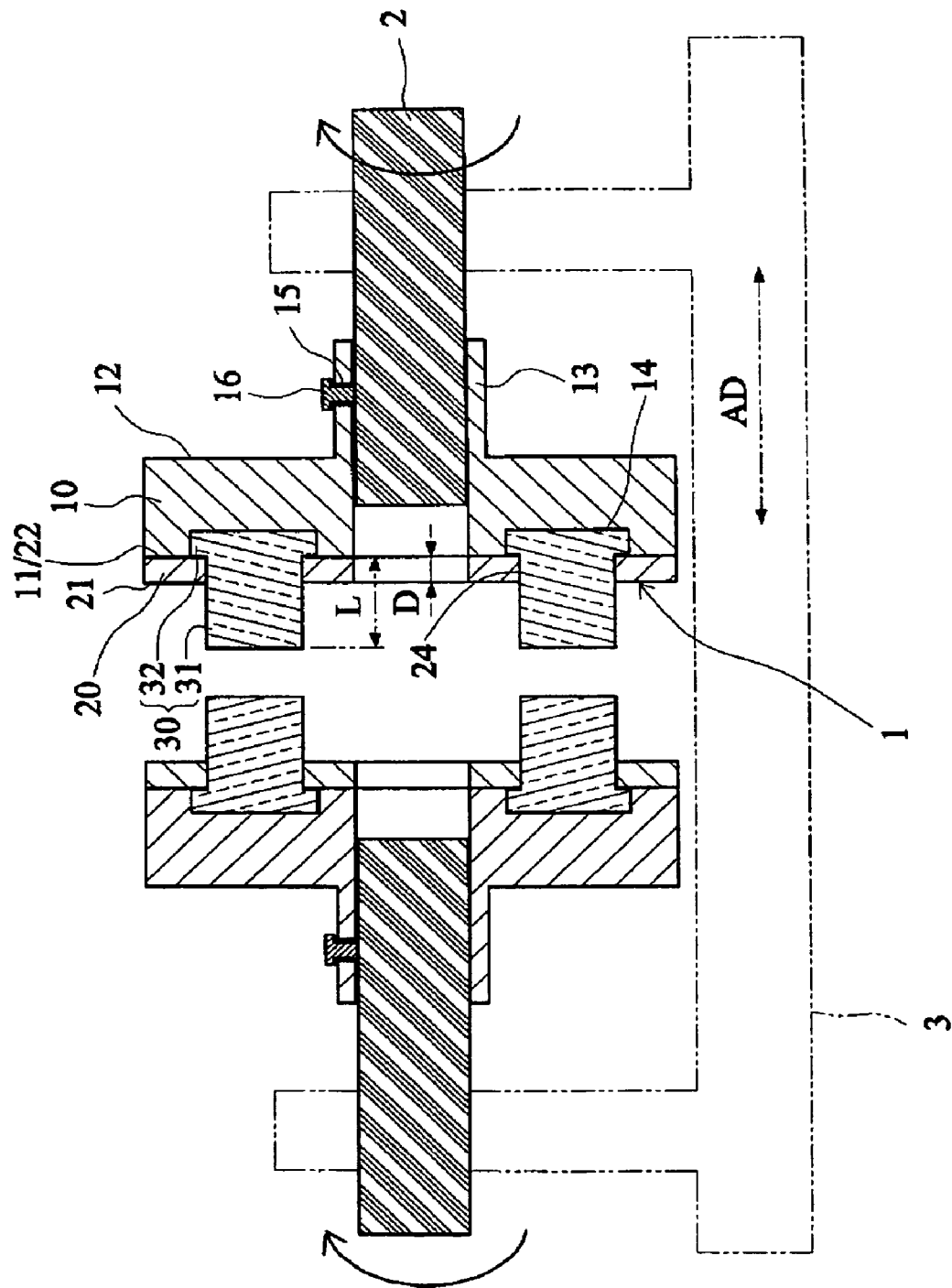
FIG. 3 is a schematic illustration showing the application of the magnetic coupler according to the first embodiment of the invention.

FIG. 3 is a schematic illustration showing the application of the magnetic coupler according to the first embodiment of the invention. As shown in FIG. 3, two magnetic couplers 1 facing each other are mounted on a base 3, which may be divided into two portions so that a gap between the two magnetic couplers 1 may be adjusted. The first backside 12 may be formed with a spindle mounting portion 13 to be mounted on a spindle 2. The magnetic elements 30 are disposed around the spindle mounting portion 13. The spindle mounting portion 13 has a screw hole 15 so that the screw 16 may be screwed into the screw hole 15 to fix the spindle 2 to the magnetic coupler 1. In this embodiment, a length L of the first portion 31 of the magnetic element 30 in an axial direction AD is longer than a depth D of the positioning hole 24 of the second body 20 in the axial direction AD, so that the magnetic element 30 projects beyond the second front side 21 of the second body 20. As shown in FIGS. 1 to 3, the size of the positioning hole 24 is smaller than the size of the positioning slot 14.

Figure 4:
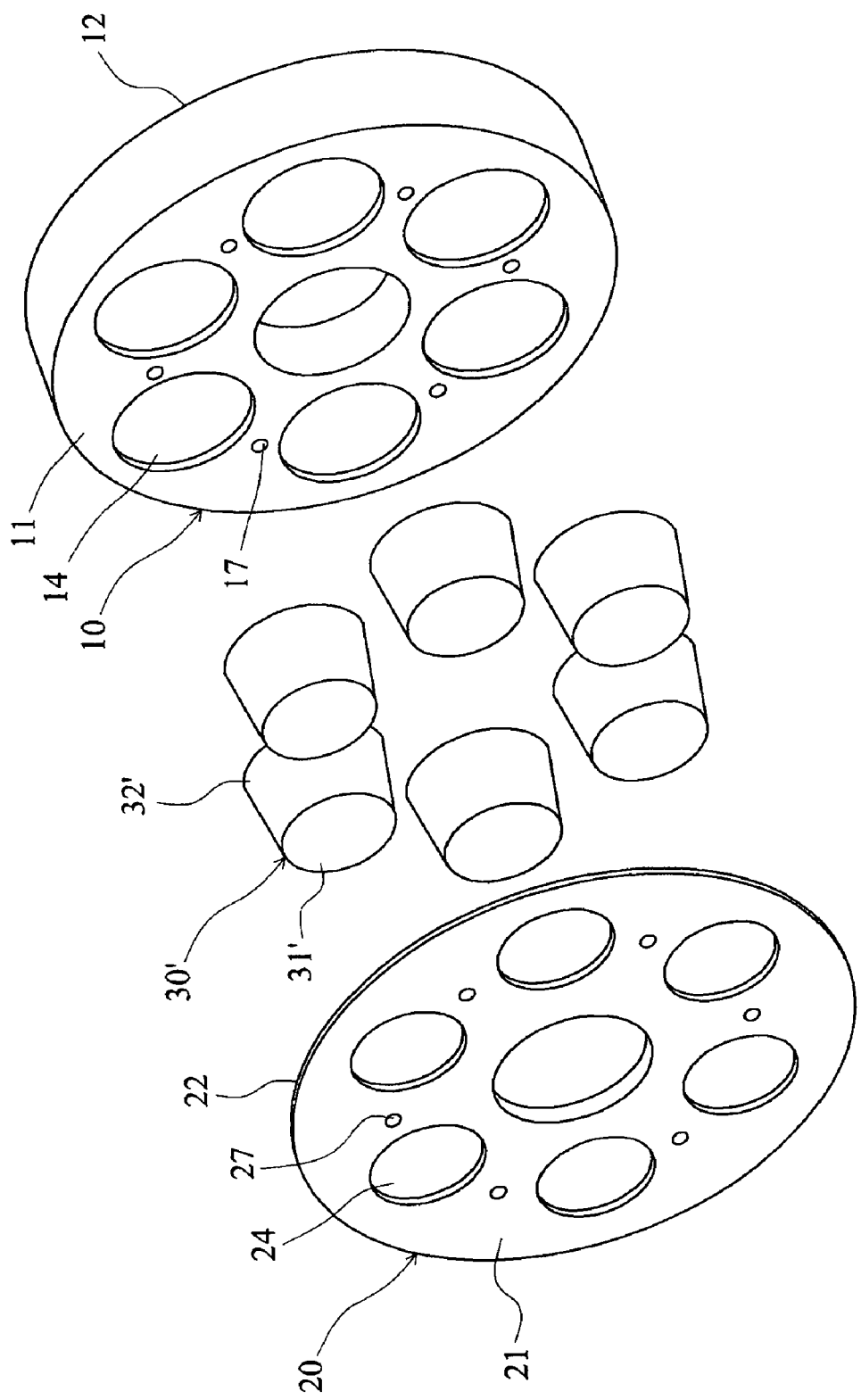
FIG. 4 is a schematically decomposed view showing a magnetic coupler according to a second embodiment of the invention.

FIG. 4 is a schematically decomposed view showing a magnetic coupler according to a second embodiment of the invention. As shown in FIG. 4, this embodiment is similar to the first embodiment except that each of magnetic elements 30' is a cone, and the size of a second portion 32' is larger than that of a first portion 31'. The cone may also be fixed to the first body 10 by the second body 20.

According to the embodiments of the invention, the magnetic elements 30 and 30' may be effectively fixed to the first body 10. The axial and radial combining intensities generated by this method are far greater than those generated by the conventional method of adhesion using the adhesive. Thus, the performance of the magnetic coupler may be greatly enhanced and the lifetime thereof may be greatly lengthened.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A magnetic coupler, comprising:
   a first body having a first front side and a first backside, wherein the first front side is formed with a plurality of positioning slots;
   a second body having a second front side and a second backside, wherein the second backside is mounted on the first front side, and the second body is formed with a plurality of positioning holes penetrating through the second body; and
   a plurality of magnetic elements, wherein each of the magnetic elements has a first portion and a second portion, and the first portions of the magnetic elements respectively penetrate through the positioning holes so that the second portions of the magnetic elements are respectively embedded into the positioning slots, wherein a length of the first portion of the magnetic element in an axial direction is longer than a depth of the positioning hole of the second body in the axial direction so that the magnetic element projects beyond the second front side of the second body, and the second portions of the magnetic elements are pressed against the first body by the second body so that the magnetic elements are firmly fixed on the first body.

2. The magnetic coupler according to claim 1, wherein the first backside is formed with a spindle mounting portion for mounting a spindle, and the magnetic elements are disposed around the spindle mounting portion.

3. The magnetic coupler according to claim 2, wherein the spindle mounting portion has a screw hole, into which a screw is screwed to fix the spindle to the magnetic coupler.

4. The magnetic coupler according to claim 1, wherein the first body and the second body have circular shapes with the same diameter.

5. The magnetic coupler according to claim 1, wherein the positioning holes and the positioning slots have circular shapes.

6. The magnetic coupler according to claim 1, wherein the first front side of the first body is formed with a plurality of screw holes, and the second front side of the second body is formed with a plurality of through holes so that a plurality of screws may penetrate through the through holes and be screwed into the screw holes to fix the second body to the first body.

7. The magnetic coupler according to claim 1, wherein a thickness of the second body is smaller than a thickness of the first body.

8. The magnetic coupler according to claim 1, wherein each of the magnetic elements is a neodymium-iron-boron (NdFeB) magnet.

9. The magnetic coupler according to claim 1, wherein the first body is composed of a magnetic-conducting material.

10. The magnetic coupler according to claim 1, wherein the second body is composed of a non-magnetic-conducting material.

11. A magnetic coupler, comprising:
    a first body having a first front side and a first backside, wherein the first front side is formed with a plurality of positioning slots;
    a second body having a second front side and a second backside, wherein the second backside is mounted on the first front side, and the second body is formed with a plurality of positioning holes penetrating through the second body; and
    a plurality of magnetic elements, wherein each of the magnetic elements has a first portion and a second portion, and the first portions of the magnetic elements respectively penetrate through the positioning holes so that the second portions of the magnetic elements are respectively embedded into the positioning slots, wherein:

a length of the first portion of the magnetic element in an axial direction is longer than a depth of the positioning hole of the second body in the axial direction so that the magnetic element projects beyond the second front side of the second body;

a size of each of the second portions, accommodated within the positioning slot, is larger than a size of each of the first portions, accommodated within the positioning hole;

a size of the positioning hole is smaller than a size of the positioning slot; and each of the second portions of the magnetic elements is a flange pressed against the first body by the second body so that the magnetic element is firmly fixed on the first body.

12. The magnetic coupler according to claim 11, wherein each of the magnetic elements has a circular cross-sectional area.

13. The magnetic coupler according to claim 11, wherein each of the magnetic elements is a cone.

14. A magnetic coupler, comprising:

a first body having a first front side and a first backside, wherein the first front side is formed with a plurality of positioning slots;

a second body having a second front side and a second backside, wherein the second backside is mounted on the first front side, and the second body is formed with a plurality of positioning holes penetrating through the second body; and a plurality of magnetic elements, wherein each of the magnetic elements has a first portion and a second portion, and the first portions of the magnetic elements respectively penetrate through the positioning holes so that the second portions of the magnetic elements are respectively embedded into the positioning slots, wherein a length of the first portion of the magnetic element in an axial direction is longer than a depth of the positioning hole of the second body in the axial direction so that the magnetic element projects beyond the second front side of the second body, and the second body is disposed outside the first body.

* * * * *